United States Patent [19]

Sasaki

[11] Patent Number: 5,459,520
[45] Date of Patent: Oct. 17, 1995

[54] ELECTRONIC CAMERA WITH OVER-SAMPLING FILTER AND METHOD FOR OVER-SAMPLING AND INTERPOLATING ELECTRONIC CAMERA IMAGE DATA

[75] Inventor: Tadao Sasaki, Kanagawa, Japan

[73] Assignee: Sony Corporation, Japan

[21] Appl. No.: 163,152

[22] Filed: Dec. 6, 1993

[30] Foreign Application Priority Data

Dec. 8, 1992 [JP] Japan ................... 4-328144

[51] Int. Cl.⁶ ........................................ H04N 7/01
[52] U.S. Cl. .................... 348/445; 348/581; 348/443; 348/222
[58] Field of Search ........................ 348/720, 581, 348/553, 561, 458, 445, 222, 443, 459, 448, 556, 441; H04N 7/07

[56] References Cited

U.S. PATENT DOCUMENTS

| | | | |
|---|---|---|---|
| 5,138,452 | 8/1992 | Soloff | 348/581 |
| 5,253,064 | 10/1993 | Yamamoto et al. | 348/581 |
| 5,255,081 | 10/1993 | Miyamoto et al. | 348/445 |
| 5,309,241 | 5/1994 | Hoagland | 348/445 |

*Primary Examiner*—James J. Groody
*Assistant Examiner*—Glenton B. Burgess
*Attorney, Agent, or Firm*—Limbach & Limbach; Ian Hardcastle

[57] ABSTRACT

A method and apparatus for processing image data produced by an electronic camera (such as image data read from a CCD device of an electronic camera) by over-sampling and then interpolating the data to convert the format and/or resolution of the data. The format of the image data may be converted to a format suitable for display on a computer monitor or the like. The invention enables the aspect ratio of a frame of image data output from a CCD device to be converted to 1:1. Preferably, the image data are filtered by a filter having a characteristic opposite to the frequency characteristic of the interpolation function, and then interpolated so that the interpolation can be carried out at a portion where the change of the frequency characteristic is small, thereby improving the image quality of the fully processed output image. The invention can be implemented in an electronic camera including an over-sampling filter (4) for over-sampling input data N times and an interpolation circuit (5) for interpolating the output from the over-sampling filter.

11 Claims, 13 Drawing Sheets

Frequency →

Frequency →

Diagram used to explain the embodiment

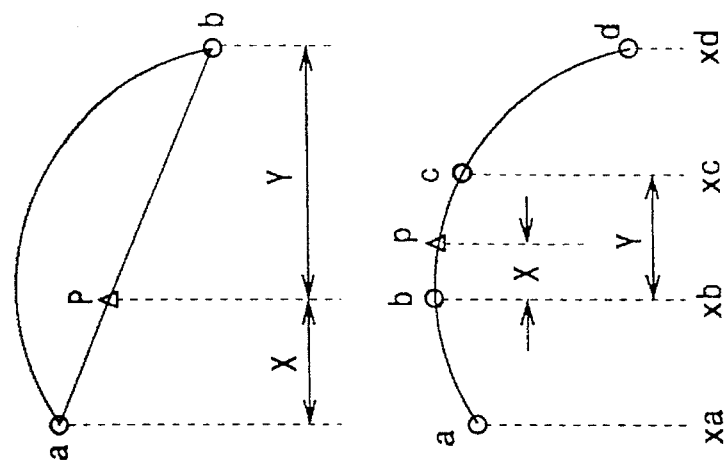
FIG. 7A
FIG. 7B
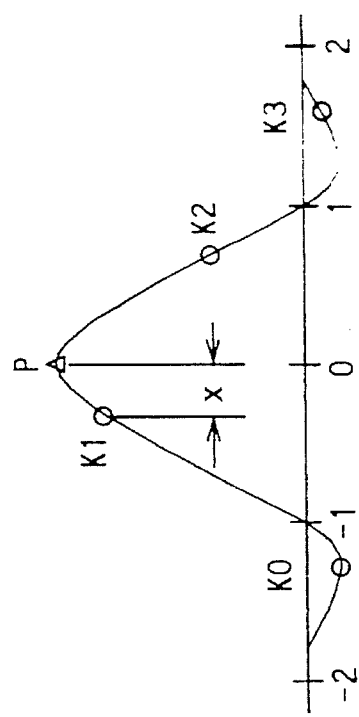
FIG. 7C

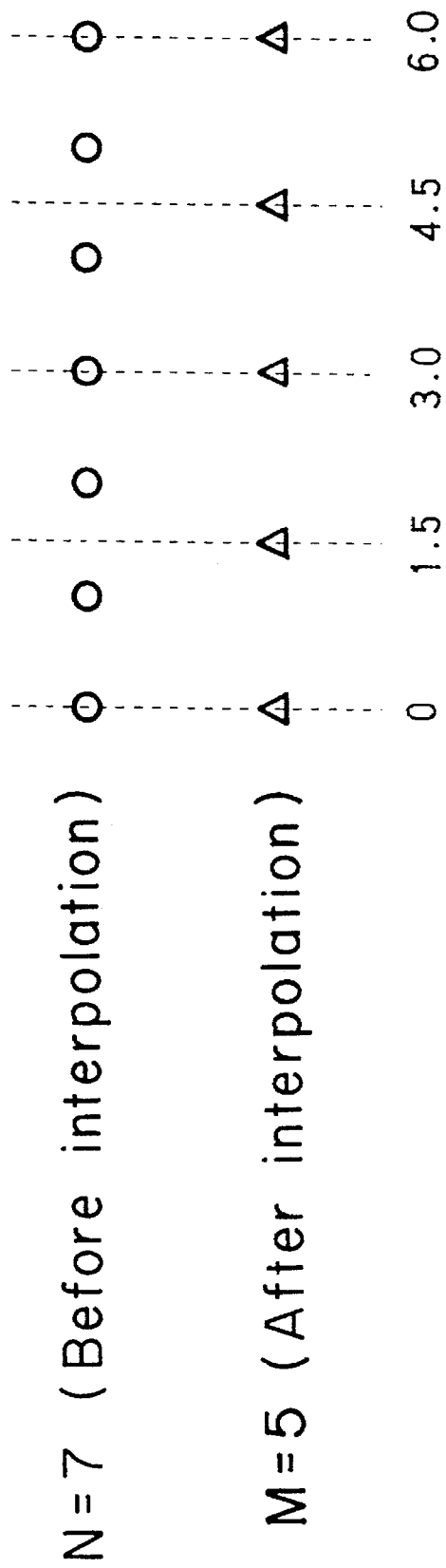

ELECTRONIC CAMERA WITH OVER-SAMPLING FILTER AND METHOD FOR OVER-SAMPLING AND INTERPOLATING ELECTRONIC CAMERA IMAGE DATA

FIELD OF THE INVENTION

The present invention relates to signal processing methods and apparatus for converting image data picked up by an electronic camera (which can be, for example, still image data in PAL or NTSC format) into a format for display on a computer monitor or printing by a computer system, or for converting such image data from one format and/or resolution to another (e.g., from PAL format to NTSC format). The invention also pertains to electronic cameras which include circuitry for performing such image data conversion.

PRIOR ART

In the prior art, image data obtained when a cameraman takes a picture of an object with an electronic still camera, for example, are supplied to a computer (personal computer or the like) and printed out by a printer (image printer or the like) connected to the computer, or such image data is interpolated to convert it from one format (e.g., PAL format) to another format (e.g., NTSC format).

FIG. 10A shows a picture obtained when a cameraman takes the picture of an object with, for example, an electronic still camera using a CCD device. The FIG. 10A picture is obtained when the cameraman takes the picture of the object with the electronic still camera while holding the electronic still camera in the longitudinal direction. This picture is similar to that obtained when the cameraman takes a picture of object with a camera using an ordinary film while holding the camera in the longitudinal direction).

The sampling rate of the analog-to-digital conversion employed to process the image data of FIG. 10A to enable it to be displayed on a computer monitor is preferably the same as the sampling rate of the CCD image pick-up device in the electronic still camera because this results in easy processing and an excellent displayed image. However, if the sampling rate of analog-to-digital conversion is equal to the sampling rate of the CCD, the displayed image data will typically be expanded or contracted in one direction. Contraction or expansion of the image data to compensate for this can be accomplished by a processes of over-sampling and thinning. But if a CCD for a PAL system is used, the required conversion rate is 1.04. Therefore 26 times over-sampling and 1/25 thinning are required (104/100=26/25). However, 26 times over-sampling requires large, complicated circuitry. Thus, an interpolating technique is typically used in this case. But, interpolation causes the problems that will be described below.

FIG. 10B shows a picture M' of an object displayed on the picture screen of a computer monitor or output by an image printer after digitizing the image M of the same object obtained when the cameraman took a picture of the object with the electronic still camera.

In a typical monitor or image printer connected to a computer, the aspect ratio of the pixels pi' is 1:1 (a square aspect ratio) as shown in FIG. 10B. In contrast, the pixels pi of the image data M obtained when the cameraman takes a picture of the object using the electronic still camera generally have a different aspect ratio.

Accordingly, in the prior art, when image data from an electronic still camera (or the like) are processed for display on a computer monitor (or the like) the number of pixels is converted using interpolation to give the image data from the electronic still camera or the like a "square" aspect ratio. By carrying out such conversion of the number of pixels, image data having an aspect ratio of, for example, 26:25 are converted to image data having an aspect ratio of 1:1 (a "square" aspect ratio). The image data, after such conversion, can be displayed on a monitor, or printed on paper by means of an image printer, as an excellent image.

However, when the number of pixels is converted by interpolation as described above, different frequency characteristics are presented depending upon the interpolation positions, thereby deteriorating the signal close to the Nyquist frequency considerably. Thus, output image quality is considerably deteriorated.

In view of this problem, it is an object of the present invention to provide a signal processing circuit which can reduce or prevent deterioration of the quality of the image resulting from displaying an image data signal when the number of the signal's pixels is converted to thereby obtain a satisfactory output image.

SUMMARY OF THE INVENTION

A preferred embodiment of the signal processing apparatus of the invention (shown in FIG. 1) comprises electronic still video camera 10 and external computer 12. The camera comprises over-sampling circuit 4 for over-sampling input data N times, and an interpolating circuit 5 for interpolating the output from the over-sampling circuit 4. The interpolating circuit 5 preferably has a characteristic opposite to the frequency characteristic of the interpolation function implemented thereby.

According to the present invention, the interpolated image data output from interpolating circuit 5 in the desired new format are supplied to computer 12 and thereby recorded or printed out, and are also stored in memory 6 in the camera.

Camera 10 of the invention also comprises analog-to-digital converter 2 for analog-to-digital converting image data picked up by its solid state imaging device 1, frame memory 3 for storing the digitized output from analog-to-digital converter 2, video processor 7, which receives the digital image data from A-to-D converter 2 and converts these data into video format, digital-to-analog to converter 8 which converts the digital video from processor 7 into analog video, and electronic view finder 9 which displays the analog video from D-to-A converter 8. Over-sampling circuit 4 over-samples the digital image data (output from memory 3) N times.

Further, according to the present invention, interpolating circuit 5 interpolates the output of filter 4 on the basis of a characteristic opposite to the frequency characteristic of the interpolation function implemented.

According to the invention, when a frame of image data (which can be displayed on a picture screen) picked up by solid state imaging device 1 is formed of n×m pixels, these n×m pixels are converted into data of n'×m' pixels by the over-sampling circuit 4 and the interpolating circuit 5.

According to the aforesaid arrangement of the invention, input data are over-sampled N times by over-sampling circuit 4, and the output from over-sampling circuit 4 is interpolated by interpolating circuit 5. Interpolating circuit 5 preferably interpolates the output from the over-sampling circuit 4 in a manner that introduces a characteristic opposite to the frequency characteristic of the interpolation function. The format-converted data output from interpolating circuit 5 are input to computer 12 and thereby recorded or printed out.

Also, according to the arrangement of the invention, the image data picked up by solid state imaging device 1 (typically a CCD) are analog-to-digital converted by analog-to-digital converter 2, the converted output from A-to-D converter 2 is stored in the memory 3, the output from memory 3 is over-sampled N times by over-sampling circuit 4, the output from over-sampling circuit 4 is interpolated by interpolating circuit 5, and the interpolated output from interpolating circuit 5 is recorded by the memory card 6.

BRIEF DESCRIPTION OF THE DRAWINGS

FIGS. 7A, 7B, and 7C are diagrams used to explain the conversion of the sampling frequency of the image according to the embodiment of the signal processing apparatus of the present invention.

FIG. 8 is a diagram used to explain the conversion of the sampling frequency of the image according to the embodiment of the signal processing apparatus of the present invention.

DETAILED DESCRIPTION OF THE PREFERRED EMBODIMENT

An embodiment of the signal processing apparatus according to the present invention will hereinafter be described in detail with reference to FIG. 1.

Figure 1:
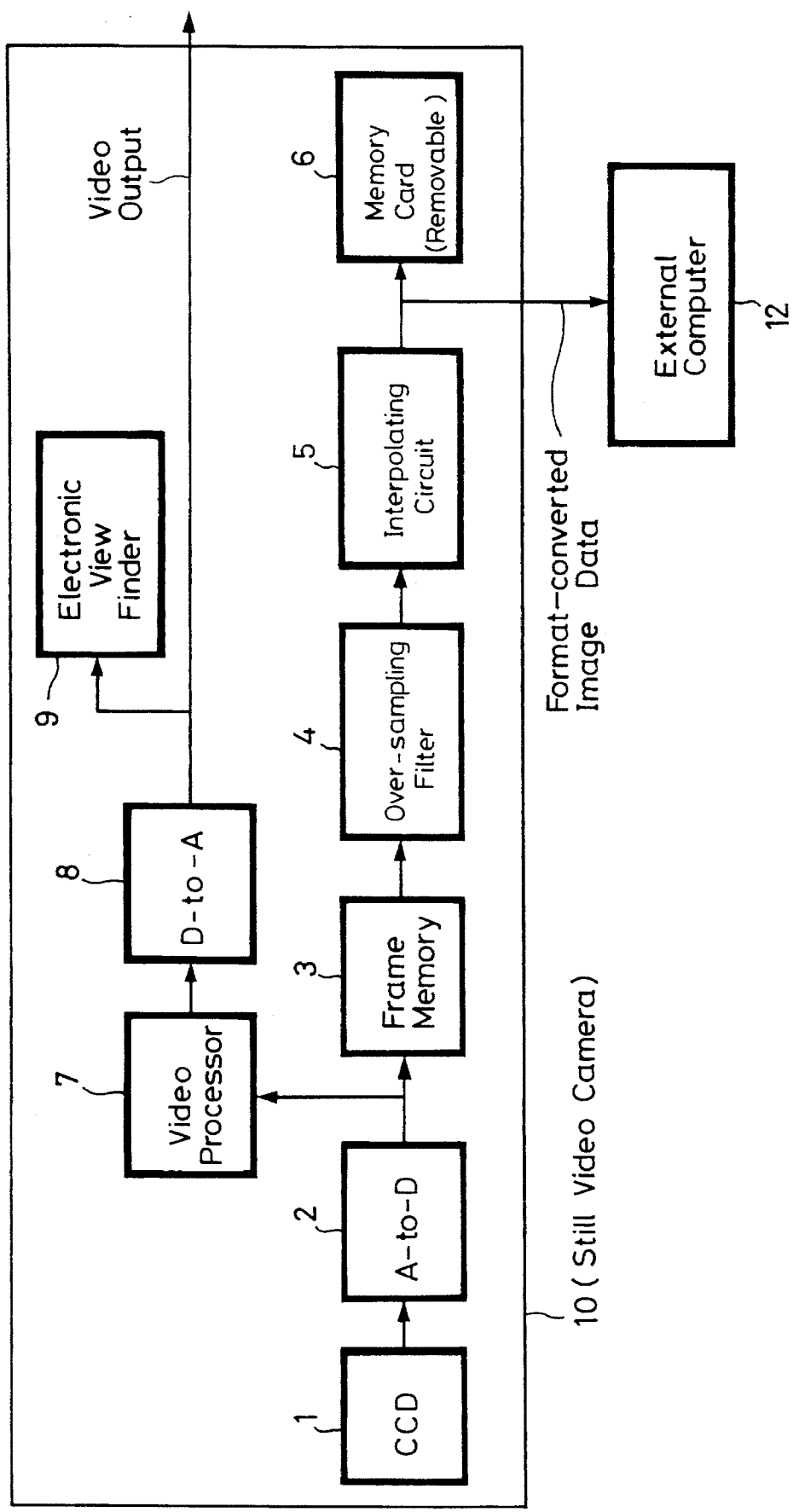
FIG. 1 is block diagram showing an embodiment of a signal processing apparatus according to the present invention.

In FIG. 1, image pickup device 1 is typically a CCD device of the type used in an electronic still camera, a video camera, or the like. Electronic camera 10 (in which image pickup device 1 and components 2–9 are mounted) is preferably a still video camera, although in other embodiments it can be a full-motion video camera or some other type of electronic camera. The output of image pickup device 1 is supplied to A-to-D converter 2 and converted into a digital signal by A-to-D converter 2. Then, the digital signal is supplied to one or both of frame memory 3 and video processor 7. Means can be provided for selectively disabling one of processor 7 and memory 3. A digital signal from A-to-D converter 2, representing a frame of image data, is stored in frame memory 3 in response to address data and control data from a writing/reading circuit (not shown) within camera 10.

Image data representing one frame stored in frame memory 3 are read out therefrom in response to address data and control data from a writing/reading circuit, not shown, and the image data thus read are supplied to filter 4.

Filter 4 is an over-sampling filter which over-samples the horizontal (or vertical) sampling frequency, for example, by doubling the horizontal sampling frequency. Image data whose horizontal sampling frequency is increased by a factor (e.g., doubled) by filter 4 are supplied to interpolating circuit 5.

Interpolating circuit 5 changes the horizontal sampling frequency of the over-sampled image data from filter 4 by interpolation in order to match the horizontal sampling frequency of the image data from filter 4 to the vertical sampling frequency. Thus, image data generated by forming an image on the pixels having an aspect ratio which is not a square aspect ratio in the CCD device 1 can be converted for display or printing using a device having pixels with a square aspect ratio of 1:1.

The image data thus interpolated by interpolating circuit 5 are supplied to external computer 12, and stored in memory 6. Memory 6 is preferably a memory card removably mounted within camera 10. Image data in memory 6 can be read by computer 12 or the like. Computer 12 is a control machine having a CPU, such as a personal computer, a work station or the like. Computer 12 can include a recording medium or be connected with an external recording medium.

Memory 6 can be implemented, for example, as a memory card (so-called RAM card or the like), a hard disk, a magneto-optical disc, or printing paper utilized in an image printer or the like. In preferred embodiments, the format-converted image data from interpolating circuit 5 which are stored or recorded in memory 6 determine a square lattice having aspect ratio 1:1.

The over-sampling filter 4 is useful in the case that A-to-D converter 2 digitizes the image data at a rate corresponding to the CCD sampling rate, which is not the rate corresponding to the different, desired aspect ratio. Over-sampling filter 4 need not be employed in the case that A-to-D converter 2 digitizes the image data at a rate corresponding to the desired aspect ratio.

The improvement of picture quality resulting from over-sampling by filter 4 shown in FIG. 1 will next be described with reference to FIGS. 2 to 5.

To effect over-sampling in the preferred embodiment, a signal whose value is "0" is inserted between each pair of consecutive samples of the original signal (from frame memory 3), thereby doubling the sampling frequency. The resulting intermediate signal is the sum of the original signal and a signal which results from amplitude modulating the original signal at the original sampling frequency (fs). The intermediate signal, which has twice the amplifying frequency of the original signal, is then low-pass filtered to obtain its low frequency component, which has substantially the same waveform as the original signal but twice the sampling frequency.

Figure 2:
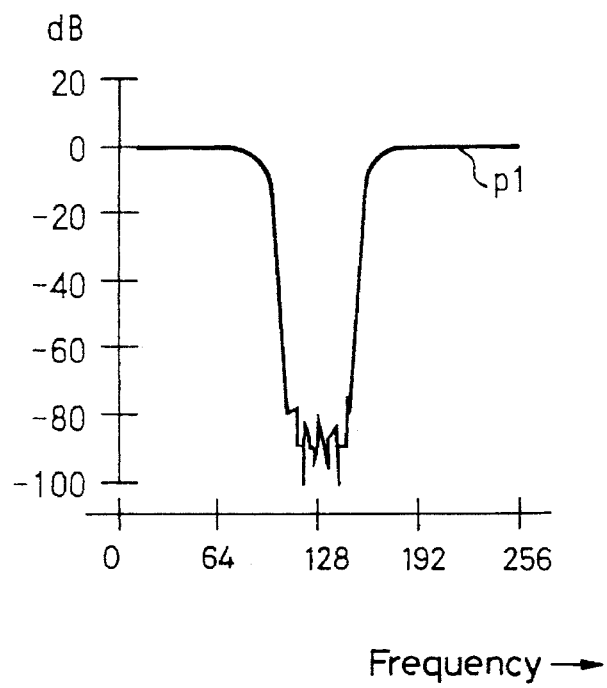
FIGS. 2 and 3 are diagrams used to explain over-sampling and the improvement thereof according to the embodiment of the signal processing apparatus of the present invention.
Figure 3:
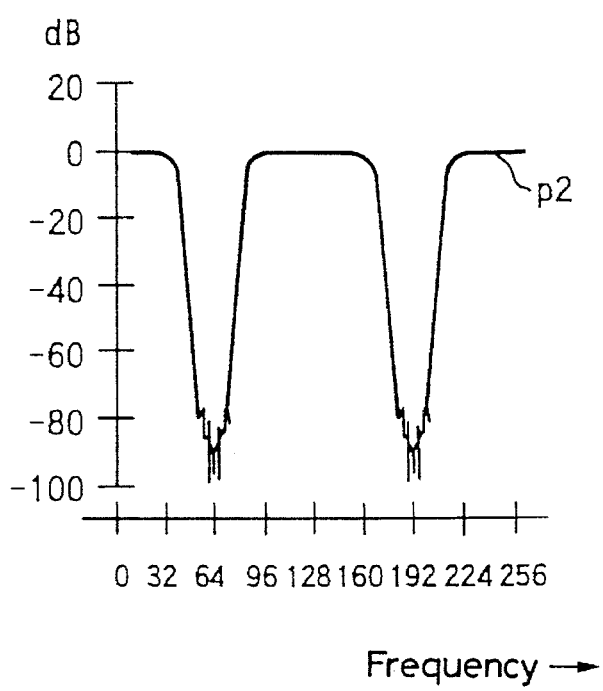

FIGS. 2 and 3 show the effect of this signal processing in the frequency domain obtained by using an FFT (Fast Fourier Transform).

FIG. 2 shows a Fourier-transform p1 of the signal received at the input of over-sampling filter 4. This signal includes frequencies from direct current to a frequency 0.8 times the Nyquist frequency, and is processed at 256 points according to the FFT. FIG. 3 shows a Fourier-transform p2 of the intermediate signal produced by inserting "0" into the signal of FIG. 2, as described above. The intermediate signal is also processed at 256 points according to the FFT.

Figure 4:
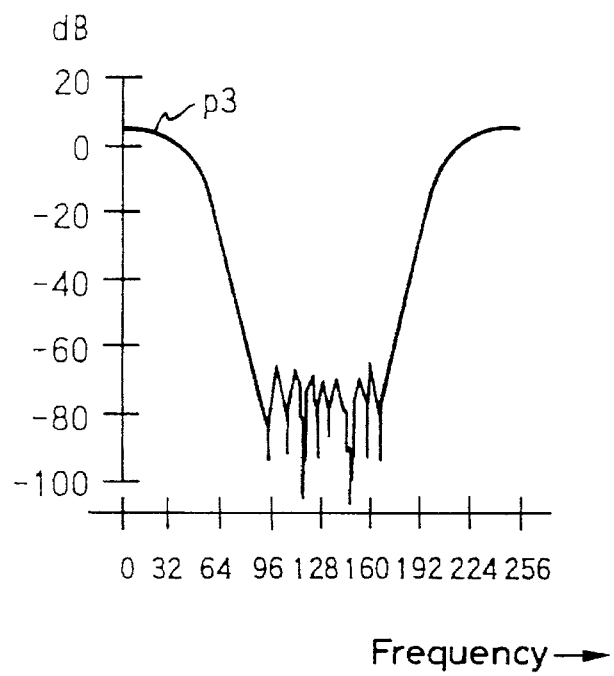
FIGS. 4 and 5 are diagrams used to explain the over-sampling and the improvement thereof according to the embodiment of the signal processing apparatus of the present invention.
Figure 5:
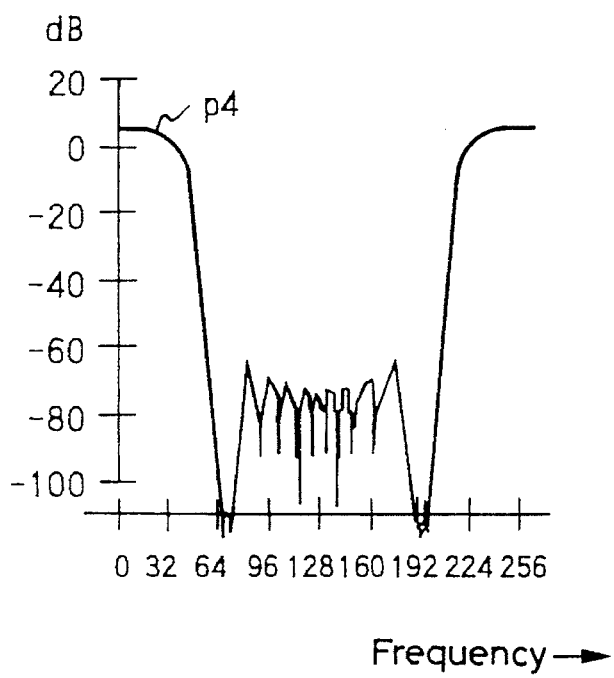
Figures 6A, 6B:
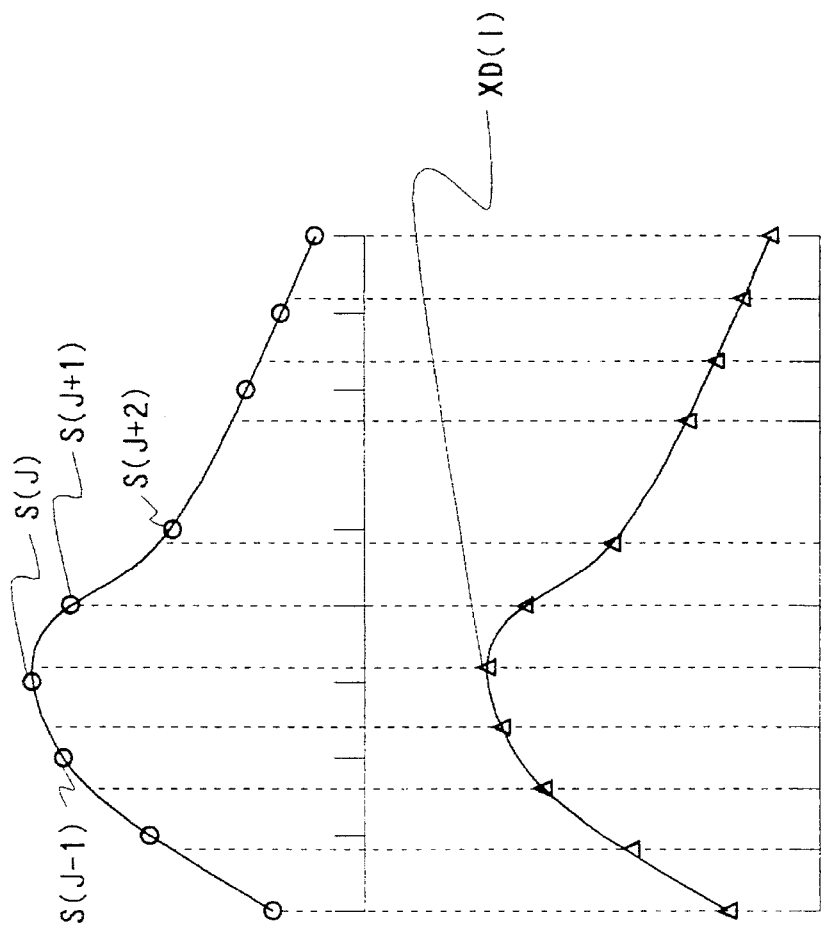
FIGS. 6A and 6B are diagrams used to explain the conversion of the sampling frequency of the image according to the embodiment of the signal processing apparatus of the present invention.

If the signal of FIG. 3 is filtered by a low-pass filter having the characteristic shown by p3 in FIG. 4, the resulting low-pass filtered signal has the frequency characteristic shown by p4 in FIG. 5. A low-pass filter for use in the over-sampling filter of the invention to transform the FIG. 4 signal to the FIG. 5 signal can be implemented as a finite impulse response (FIR) filter having 19 taps, for example.

Figure 11:
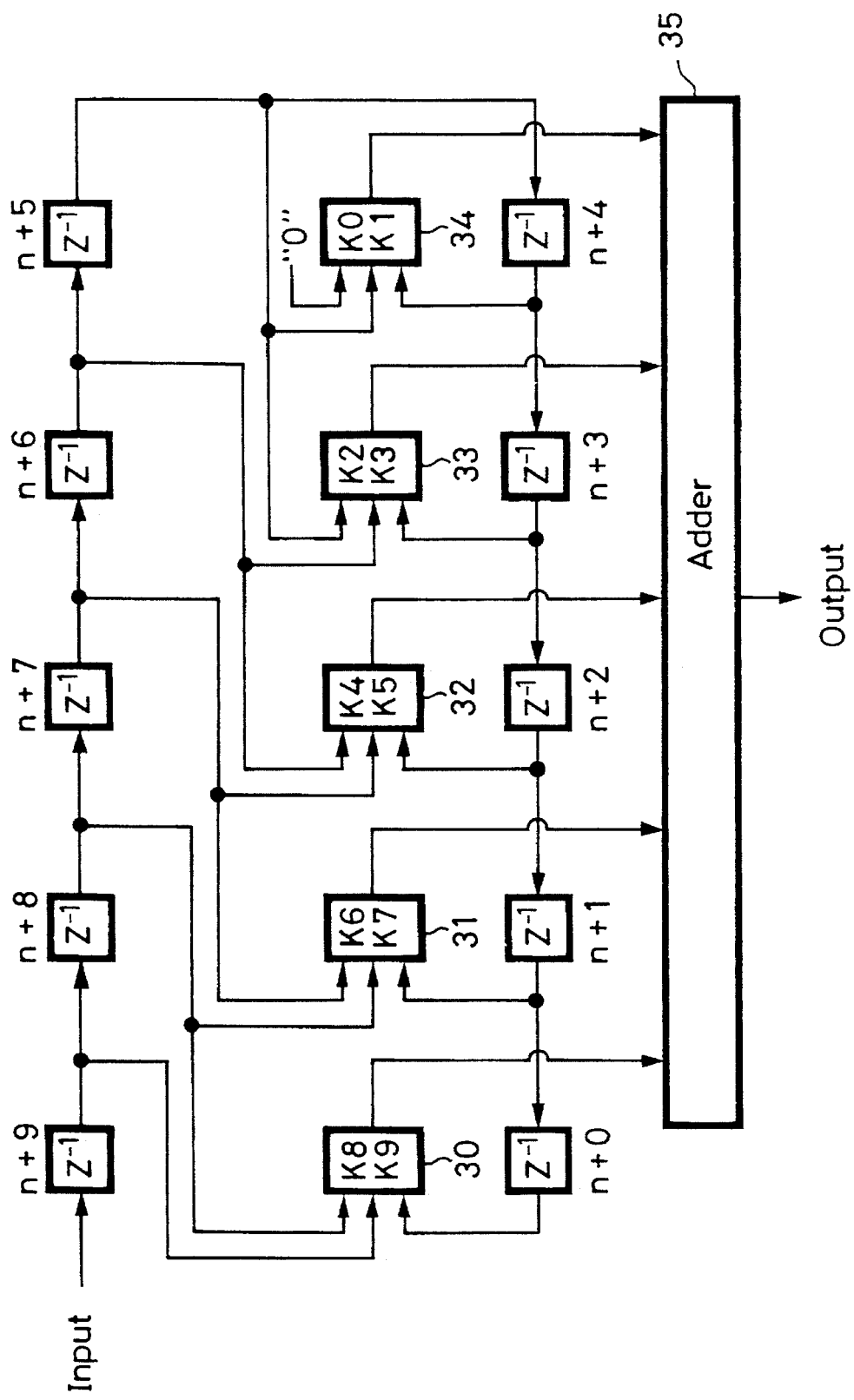
FIG. 11 is a block diagram of a portion of an over-sampling filter employed in a preferred embodiment of the invention.

FIG. 11 is a block diagram of an over-sampling filter for use in the invention, which is implemented as a finite impulse response (FIR) filter having 19 taps. Examples of respective tap coefficients of the 19 taps are indicated below:
Tap coefficient of 1st tap=−0.00048562305
Tap coefficient of 2nd tap=0.00242201984
Tap coefficient of 3rd tap=0.01067826524
Tap coefficient of 4th tap=0.00731039792
Tap coefficient of 5th tap=−0.03275762126
Tap coefficient of 6th tap=−0.08041051030
Tap coefficient of 7th tap=−0.02339377254
Tap coefficient of 8th tap=0.22079601884
Tap coefficient of 9th tap=0.54590094090
Tap coefficient of 10th tap=0.69987958670
Tap coefficient of 11th tap=0.54590094090
Tap coefficient of 12th tap=0.22079601884
Tap coefficient of 13th tap=−0.02339377254
Tap coefficient of 14th tap=−0.08041051030
Tap coefficient of 15th tap=−0.03275762126
Tap coefficient of 16th tap=0.00731039792
Tap coefficient of 17th tap=0.01067826524
Tap coefficient of 18th tap=0.00242201984
Tap coefficient of 19th tap=−0.00048562305.

If an FIR filter having a symmetrical order of odd numbered order is utilized as the over-sampling filter (as in FIG. 11), then the number of multipliers can be reduced considerably. If the coefficients are symmetrical, as are the above-listed coefficients, in which the 1st is identical to the 19th, the 2nd is identical to the 18th, and so on, the number of multipliers can be reduced by half. Moreover, since half of the input data values have a "0" value, the number of multipliers can be further reduced by half.

More precisely, N multipliers are required, where N is the number which results from rounding up to the nearest integer the number of taps divided by four. In this case, there are 10 different coefficients (the 1st is identical to the 19th, the 2nd is identical to the 18th, and so on). These coefficients are divided into two groups and utilized alternately.

The over-sampling filter of FIG. 11 (an FIR filter with 19 taps) will next be described by way of example. Ten consecutive input data values (labeled n+0, n+1, n+2, n+3, n+4, n+5, n+6, n+7, n+8, and n+9, in earliest to latest order) are processed per cycle. Alternating ones of these values have "0" value, as explained above. The filter includes five identical multipliers 30, 31, 32, 33, and 34, and an adder circuit 35, connected as shown in FIG. 11.

Figure 12:
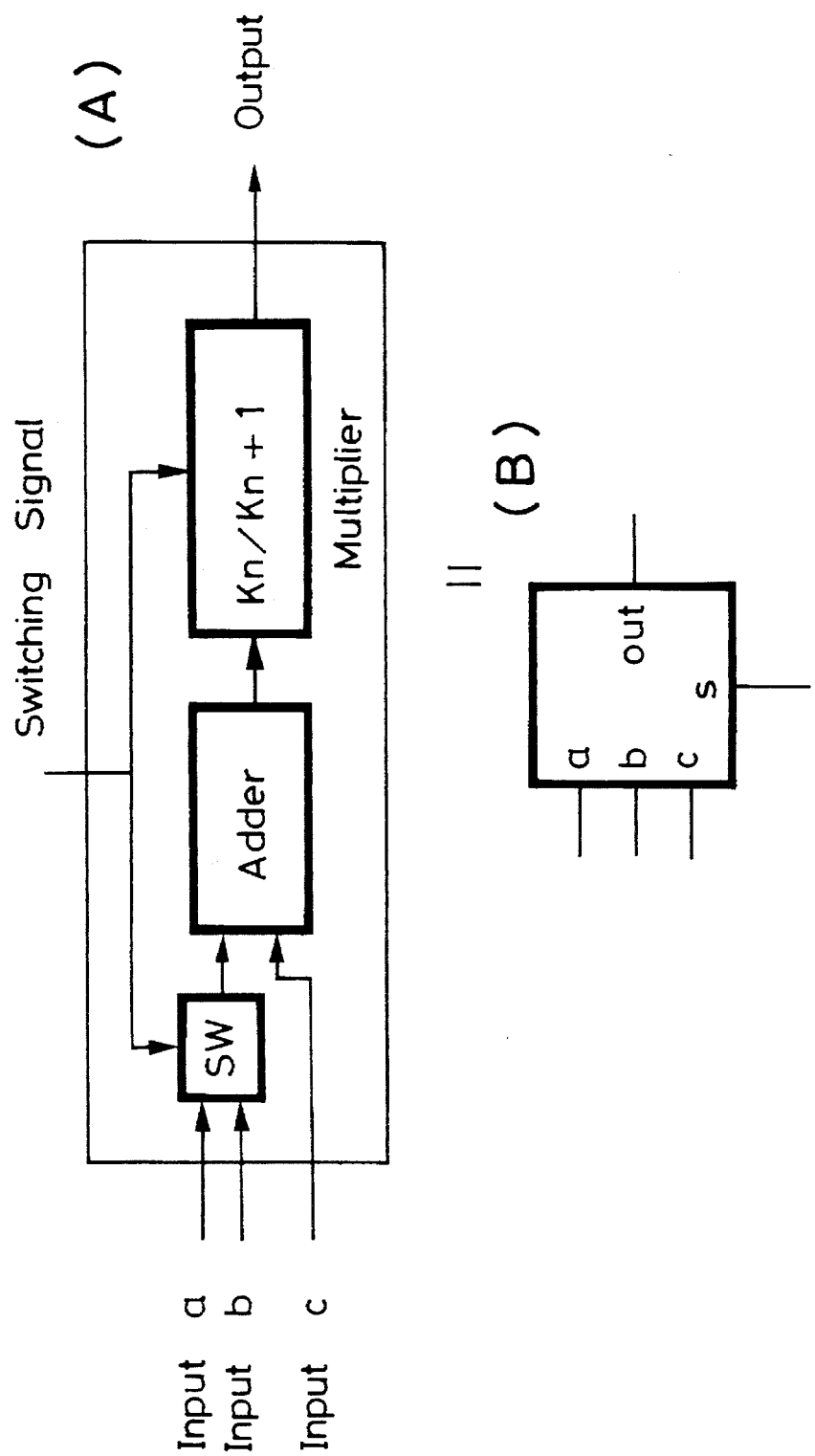
FIG. 12 is a block diagram of a multiplication unit of the FIG. 11 filter.

A preferred embodiment of multiplier 30 (and thus of each of multipliers 31–34) is shown in FIG. 12. With reference to FIG. 12, in the first half of each operating cycle, the switching signal in its first state causes the switch "SW" in the multiplier to pass the input value on the first input line (input "a") to the first input of the adder, which adds it to the input value on the third input line (input "c"), and outputs the summed value to the coefficient multiplier. The switching signal in its first state also causes the coefficient multiplier to multiply the summed value by coefficient "$k_n$", and to output the product to adder 35 (shown in FIG. 11). In the second half of each operating cycle, the switching signal in its second state causes the switch "SW" in the multiplier to pass the input value on the second input line (input "b") to the first input of an adder, which adds it to the input value on the third input line (input "c"), and outputs the summed value to the coefficient multiplier. The switching signal in its second state also causes the coefficient multiplier to multiply the summed value by coefficient "$k_{n+1}$", and to output the product to adder 35. Adder 35 outputs the sum of the inputs it receives in each cycle.

In FIG. 11, coefficients $k_n$ (where n=0, 1, 2, 3, 4, 5, 6, 7, 8, and 9) are the nine different values of the nineteen above-listed tap coefficients.

Alternatively, the over-sampling filter of the invention can be implemented as an FIR filter with seven taps, which comprises two calculators, each for calculating a sum of products. This filter has four input data lines, with two input data values alternately supplied on each of three of the lines to alternating ones of the calculators, and data supplied from the fourth line to only one of the calculators. In each calculator, data that use the same coefficient may be multiplied the coefficient after they had been added. In one example, there are required two multipliers. In addition, two adders (and a data selector) must be connected to the front stage of the multipliers and the two adders must be connected to the rear stage of the multipliers.

In each embodiment of the invention, the over-sampling filter needs gain. Since "0" values are inserted into the input signal as described above, the amplitude in the low frequency range is reduced. Therefore, such reduced amplitude must be compensated for. The cut-off frequency, the blocking frequency and the attenuating amount in the blocking region of the filter must be determined on the basis of the frequency band of the original signal, the frequency band required after processing or the like.

The signal level near ½ of the Nyquist frequency is particularly important, and this considerably affects the design of the over-sampling filter. For example, the Nyquist frequency component must be attenuated sufficiently. When each value of the signal is formed of 8 bits, an attenuation of about 60 dB is required.

Conversion of the sampling frequency of the image data will be further described with reference to FIGS. 6 through 9.

As described above, it is often desirable that the aspect ratio of each frame of the output image data (the data to be handled by computer 12 or the like) is 1:1, that the frame is formed of pixels having a square aspect ratio.

To form the output image data for display using pixels having a square aspect ratio, the image may be appropriately enlarged or reduced in the vertical (or horizontal) direction. More precisely, the sampling frequency is converted to make the vertical and horizontal sampling frequencies equal.

As a method of enlarging or reducing a frame of image data in the vertical or horizontal direction, a method based on interpolation is frequently utilized. However, methods based on interpolation can cause considerable deterioration of the image quality in the high frequency region of the image. For this reason, the invention over-samples the data (e.g., at double the sampling frequency) as described above and then interpolates the over-sampled data.

The interpolation method employed in the preferred embodiment will next be described. Although the interpolation in this embodiment is used to convert the image data for display using pixels having a square aspect ratio, this interpolation method may generally be extended to include enlargement and reduction by arbitrary amounts. In order to convert input image data originating from non-square pixels to output image data for display using square pixels, interpolation is employed to convert the number of the input data pixels so that the ratio of pixels in the horizontal and vertical directions of the image becomes equal to that required for pixels of the desired aspect ratio.

For example, when the desired aspect ratio of the monitor is 4:3, interpolation can be performed to convert input image data originating from an array of 390×300 pixels into intermediate image data for display using an array of 400× 300 pixels. This processing is of the same type employed to obtain the data shown in FIG. 6B from the data shown in FIG. 6A. For example, with input data from a television receiver, the interpolation method can be used to increase the number of scanning lines. That is, when S(J) represents an image data pixel received at a certain time (J) in FIG. 6A, then pixels S(J−1), S(J), S (J+1), S(J+2), and optionally also additional ones of the image data pixels, are interpolated to generate intermediate (interpolated) pixel data, including interpolated pixel XD(I) shown in FIG. 6B.

Examples of interpolation methods which can be employed include the nearest neighbor method, the bi-linear interpolation method, the third-order interpolation method, and the like. Examples of third-order interpolation methods include an interpolation method that uses sinc(x) (referred to as the "sinc" function ((sin x)/x) as the interpolation function, and an interpolation method that uses a spline function as the interpolation function.

The nearest neighbor method uses data that are nearest to the coordinate to be obtained.

According to the bi-linear interpolation method, as shown in FIG. 7A, the approximation is carried out using a straight line connecting two points a and b which are ahead of and behind a coordinate point P to be calculated. In the illustrated case, the calculated coordinate point P can be obtained using the following equation (1):

$$P = a \times Y + b \times X \quad (\text{where } X+Y=1) \qquad (1)$$

According to the third-order interpolation method, as shown in FIG. 7B, the interpolation is carried out using four points a, b, c and d around the coordinate point P to be calculated. In the illustrated case, the calculated coordinate point P can be obtained by the following equation (2):

$$P = a \times K0 + b \times K1 + c \times K2 + d \times K3 \qquad (2)$$

where K0, K1, K2, and K3 are coefficients.

In the case that sinc (x)=sin(x)/x is used as the interpolation function, the coefficients K0 to K3 are obtained by the following equations (3):

$$\begin{aligned}
K0 &= 4 - 8Z + 5Z^2 - Z^3 \quad (\text{where } Z = 1+X) \\
K1 &= 1 - 2Z^2 + Z^3 \quad (\text{where } Z = x) \\
K2 &= 1 - 2Z^2 + Z^3 \quad (\text{where } Z = 1-x) \\
K3 &= 4 - 8Z + 5Z^2 - Z^3 \quad (\text{where } Z = 2-x)
\end{aligned} \qquad (3)$$

The values obtained by the equations (3) determine an approximate value of sin(x)/x between −2π to 2π. Sin(x)/x is a curve shown in FIG. 7C and the amplitude thereof corresponds to coefficients k0 to K3.

Figure 13:
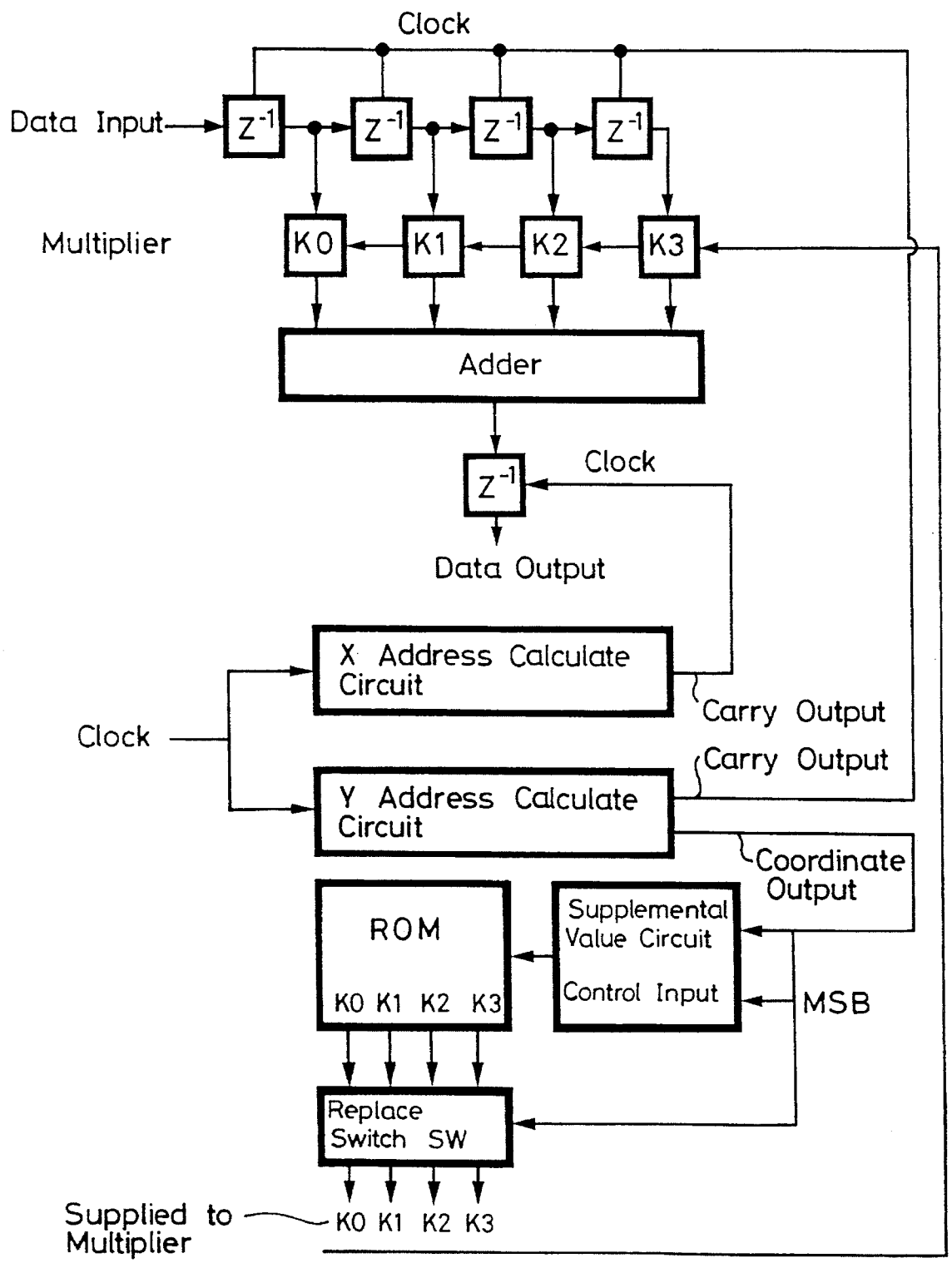
FIG. 13 is a block diagram of an interpolation circuit employed in a preferred embodiment of the invention.
Figure 14:
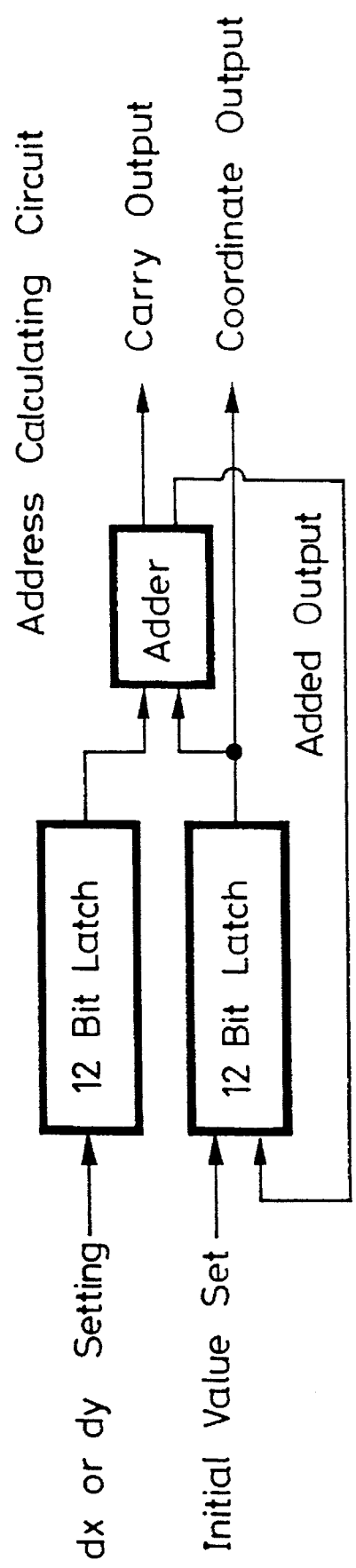
FIG. 14 is a block diagram of an address calculating circuit employed in the FIG. 13 circuit.

FIG. 13 is a block diagram of the interpolation circuit employed in the preferred embodiment of the invention for generating each of the required number of different sets (e.g., 102) of coefficients K0, K1, K2, and K3. The FIG. 13 circuit also includes four multipliers (labeled "K0," "K1," "K2," and "K3"), and an adder for adding the outputs of the four multipliers. The four multipliers and the adder calculate each interpolated pixel (labeled "data output" in FIG. 13) from each set of four coefficients and the corresponding set of four input pixels. FIG. 14 is a block diagram of an address calculating circuit which can be used to implement the circuit labeled "X address calculate circuit" and the circuit labeled "Y address calculate circuit" in FIG. 13.

Figure 13A:
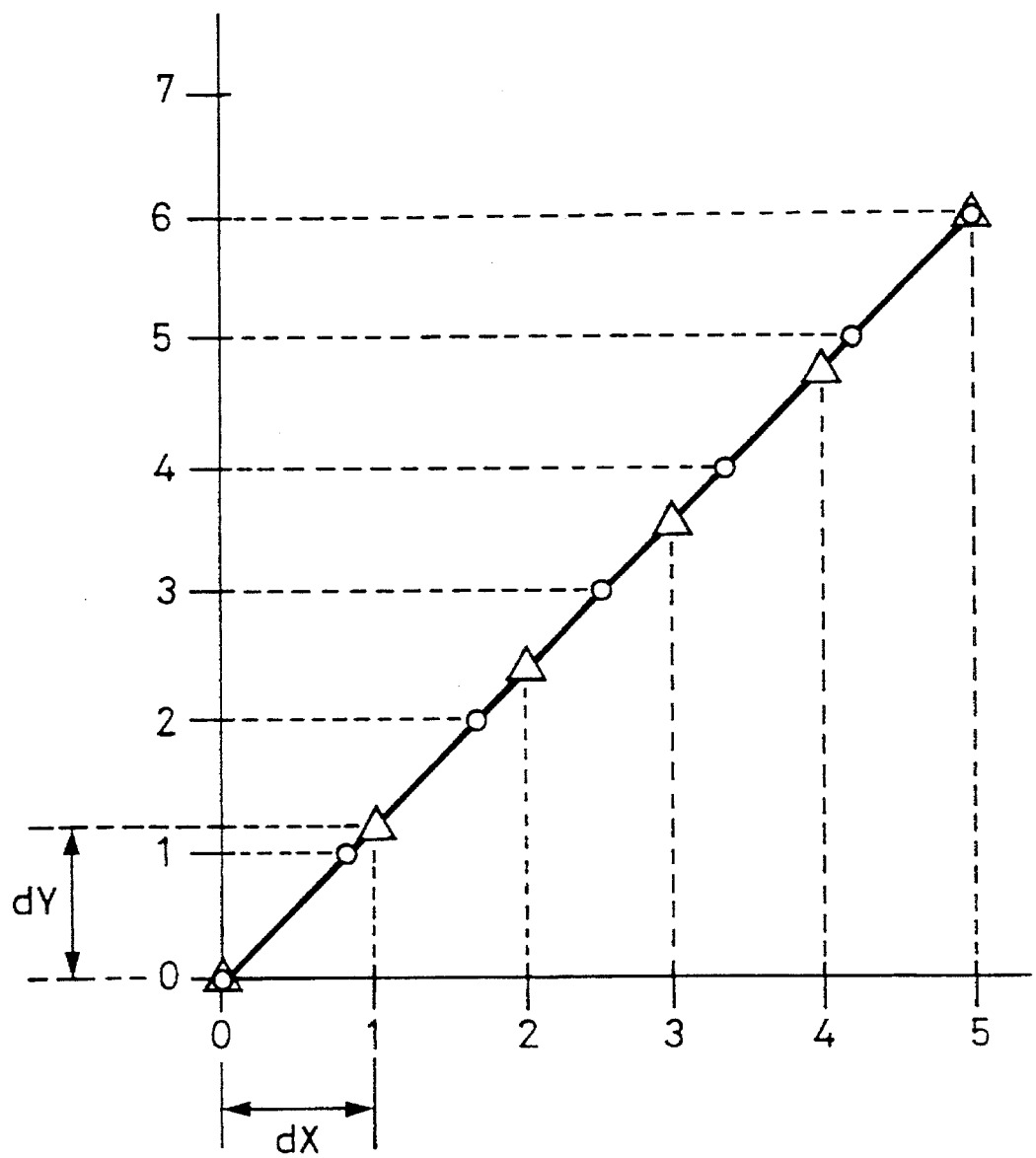
FIG. 13A is a diagram used to explain the circuit of FIG. 13.

It is helpful to consider FIG. 13A, to appreciate the method of operation of FIG. 13.

The first step of the interpolating operation is to represent the positions of pixels after the interpolating operation in terms of the positions of pixels before the interpolating operation. In FIG. 13A, the circles represent positions of pixels before the interpolating operation, and the triangles represent positions of pixels after the interpolating operation. The coordinates (Xn,Yn) represent the address of the Nth pixel after the interpolating operation.

The differences dX,dY (shown in FIG. 13A) calculated by dX=Q/Q, dY=P/Q, respectively, where P is the number of pixels before the interpolating operation, and Q is the number of pixels after the interpolating operation.

An integral number identifying each pixel is required for the interpolating operation. A change of the integral number of Y represents the input of data. Change of the integral number of X represents the output of data.

In FIG. 13, the "carry" output of "X address calculate circuit" is employed as a clock for transforming output data out from the phase delay circuit which receives the output of the adder. The "carry" output of the "Y address calculate circuit" is employed as a clock for transferring input data into the multipliers. The "coordinate" output of the "Y address calculate circuit" (which is an integral number) is provided to the "supplemental value" circuit.

In the function described by equations (3), if X is replaced by (1−X), the order of K0 to K3 is reversed (K0, K1, K2, and K3 become K3, K2, K1 and K0). This symmetry allows the supplemental value circuit of FIG. 13 to be used to reduce the amount of data which must be stored in ROM.

In accordance with the MSB (most significant bit) of the coordinate output of the "Y address calculate circuit", when 0≦X≦0.5, the coordinate output of the Y address calculate circuit is passed through the supplemental value circuit to the ROM without changing. When 0.5<X≦1.0, the coordinate output is converted into a supplemental value of its own at the supplemental value circuit. The supplemental value circuit is controlled by the MSB of the coordinate output. For example if 0≦X≦0.5, the supplemental value circuit may output "1000" in response to a coordinate output of the Y address calculate circuit, but if 0.5<X≦1.0, the supplemental value circuit may output "0111" to the ROM in response to this coordinate output value.

The four coefficients K0, K1, K2, and K3 that are output from the ROM (in response to each coordinate output from the "Y address calculate circuit") are supplied to the multipliers (as shown in FIG. 13).

When the sampling frequency of image data is converted by the interpolation method, a beat occurs in the high frequency region of the image as described above. A cause of such beat is that the frequency characteristic of the amplitude is changed by utilizing the different coefficients in accordance with the different interpolation positions. Such change brings the condition that is provided by the AM modulation, and the period thereof is related to the ratio of pixels that have been converted to pixels not yet converted. The amplitude thereof is related to the frequency of the image.

The frequency characteristic resulting from performing interpolation can be obtained by processing the impulse response of the system using a Fourier transform. In the case of interpolation, the number of frequency characteristics produced corresponds to the number of sets (one set is formed of four coefficients) of coefficients utilized in the interpolation. Let it be assumed that N is the number of pixels that are not yet converted and that M is the number of pixels that were converted. Also, let it be assumed that n/m is obtained by reducing (N−1)/(M−1). Then, m kinds of frequency characteristics are produced. The case that N=7 and M=5 are established will be described by way of example with reference to FIG. 8.

Coefficients of the sinc function that are used when an image formed of five pixels (after interpolation) shown in FIG. 8 is obtained by interpolating an image formed of seven pixels (before interpolation) shown in FIG. 8 are expressed by the following equations (4):

when X=0.0:

K0=0.0,

K1=1.0,

K2=0.0,

K3=0.0, and when X=0.5:

K0=−0.125

K1=0.625

K2=0.625

K3=−0.125        (4)

These coefficients represent the impulse response per se. If these coefficients are processed using a Fourier transform, then a frequency response can be obtained.

Figure 9A:
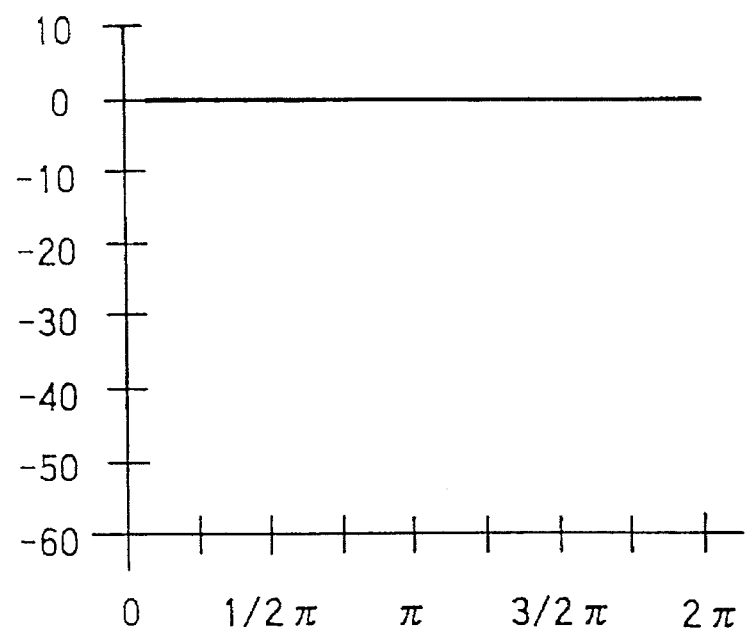
FIGS. 9A and 9B are diagrams used to explain the conversion of the sampling frequency of the image according to the embodiment of the signal processing apparatus of the present invention.
Figure 9B:
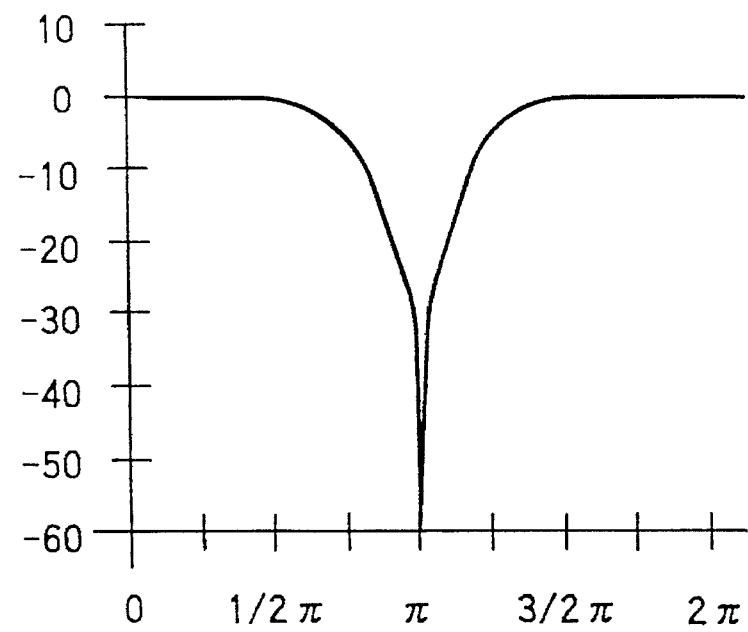
Figure 10A:
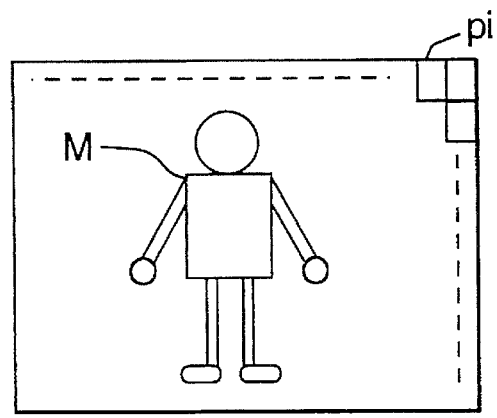
FIGS. 10A and 10B are diagrams of an image obtained using a CCD device, and a processed version of this image input to a computer and displayed on the monitor thereof according to a conventional signal processing apparatus.
Figure 10B:
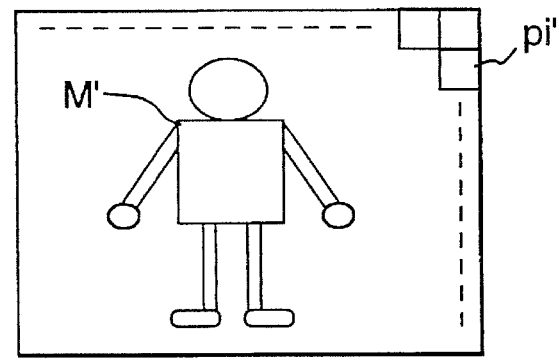

We next refer to FIGS. 9A and 9B to describe an example of a frequency response obtained when the signal is processed at 128 points using an FFT.

FIG. 9A shows the frequency response obtained when x is 0.0, and FIG. 9B shows a frequency response obtained when x is 0.5. In FIGS. 9A and 9B, $2\pi$ represents the sampling frequency and $\pi$ represents the Nyquist frequency, respectively.

In the case that interpolation is used to enlarge an image 1.02 times in one direction (as part of conversion of the CCD output of a PAL system into data consisting of a lattice of square pixels), it is to be understood that in this case the interpolation circuit of the invention would output image data formed of 102 pixels each time image data formed of 100 pixels is input.

The number of sets of coefficients utilized in this case is 102. FIG. 9A is applied to the first pixel, and FIG. 9B is applied to the 51st pixel. At the 102nd pixel, the frequency response is returned to FIG. 9A. With respect to respective intermediate pixels, there are produced frequency responses which are intermediate ones between FIGS. 9A and 9B.

As is apparent from FIGS. 9A and 9B (which show frequency characteristics), different frequencies are affected in a different manner. A signal component at DC (or a signal component close thereto) is not affected by the interpolation position. However, a signal component at the Nyquist frequency is affected at maximum. While the frequency response of the first (and 102th) pixel signal is not changed in amplitude (i.e., is flat as shown in FIG. 9A), the amplitude of the frequency response of the 51st pixel signal is "0" at one point (as shown in FIG. 9B). From FIG. 9B, it is clear that signals with various frequencies are affected in a different manner.

That is to say, as is clear from FIG. 9B, each of the signal's frequency components at frequencies of less than ½ of the Nyquist frequency is affected by a relatively small amount. But, if the signal has a frequency component close to the Nyquist frequency, then the frequency component can be reduced to a frequency component at less than ½ of the Nyquist frequency by carrying out frequency conversion according to the over-sampling process. The deterioration of image quality can be reduced considerably by interpolating such signal in accordance with the invention.

In an embodiment of the invention in which the output image data from a CCD element is supplied to a computer or the like, the aspect ratio of the output from the CCD device is converted to be 1:1 (i.e., to a lattice of square pixels) by interpolation after over-sampling has been carried out.

If the oversampled image data are filtered by a low-pass filter having a frewuency characteristic opposite to the frequency characteristic of the interpolation function, the oversampled image data can be interpolated in a frequency range in which the change of the frequency characteristic of the interpolation is small, thereby improving the image quality of the converted image.

Although image data obtained by an electronic camera using a CCD device can be supplied to a computer or the like as described above, the present invention is not limited to such applications. The invention can be employed to convert image data in PAL format (e.g., image data produced by a PAL-format electronic camera) into image data having NTSC format, or for processing image data (e.g., data produced by an electronic camera) so as to display or print an image that has been enlarged or reduced in scale or the like.

The above-described embodiment is one example of the present invention and it is needless to say that various modifications thereof could be effected without departing from the gist of the present invention.

According to the present invention, since the input data is over-sampled N times by an over-sampling circuit and the output from this over-sampling circuit is interpolated by an interpolating circuit, the interpolation can be carried out in a frequency range in which where the change of the frequency characteristic of the interpolation process is small, whereby the image quality of the picture that has been converted can be improved.

Further, according to the present invention, if the interpolating circuit interpolates the output from the over-sampling circuit in a manner that imposes on the output a frequency characteristic opposite to the frequency characteristic of the interpolation function, the frequency characteristic of the interpolation function can effectively be made completely flat in addition to the above-mentioned effects.

Further, according to the present invention, if the output from the interpolating circuit is input to a computer and thereby recorded or printed out, the data of the original image can be reproduced with fidelity in addition to the above-mentioned effects.

Further, according to the present invention, if image data picked by a solid-state imaging device are analog-to-digital converted by an analog-to-digital converter, the digital output of the analog-to-digital converter is stored in a memory, the output from the memory is over-sampled N times by an oversampling circuit, the output from the over-sampling circuit is interpolated by an interpolating circuit, and the interpolated output from the interpolating circuit is recorded by a recording circuit, interpolation can be performed in a frequency range in which the change of the frequency characteristic of the interpolation process is small using a simple arrangement, thereby satisfactorily carrying out image-conversion so that the image quality of the image that has been converted can be improved.

Furthermore, according to the present invention, if the interpolating circuit introduces to the output of the over-sampling circuit a frequency characteristic opposite to the frequency characteristic of the interpolation function which it applies, the frequency characteristic can effectively be completely made flat in addition to the above-mentioned effects.

Furthermore, according to the present invention, if a frame of image data generated by a solid state imaging device and consisting of n×m pixels is converted into output image data consisting of n'×m' pixels by the over-sampling circuit and the interpolating circuit, in addition to the aforesaid effects, the aspect ratio of the converted image data can be made 1:1 (i.e., so that the n'×m' converted pixels define a lattice of square pixels), thereby obtaining an excellent image that is neither expanded or contracted.

Furthermore, the present invention can generate digital image data whose pixels define a lattice of square pixels.

In an apparatus (e.g., an electronic camera) including a CCD image pick-up device and embodying the invention, an EVF (electronic view finder) is typically required rather than an OVF (optical view finder) because the image displayed by an OVF is not perfectly equal to the image taken by the CCD.

The sampling rate of analog-to-digital conversion employed in the invention is preferably the same as the sampling rate of the CCD because this results in easy processing and an excellent displayed image. However, if the sampling rate of analog-to-digital conversion is equal to the sampling rate of the CCD, the displayed image data will typically be expanded or contracted in one direction. Expansion or contraction of the image data (to compensate for this) can be accomplished by the processes of over-sampling and thinning. But if a CCD for a PAL system is used, the conversion rate is 1.04. Therefore 26 times oversampling and 1/25 thinning are required (104/100=26/25). However, 26 times over-sampling requires large, complicated circuitry. Thus, an interpolating technique is used in this case. But, this causes the problems described above in the specification. It is an object of the invention to solve the above-described problems.

What is claimed is:

1. An electronic camera generating output image data representing an image of an object, the output image data being for display by a display device including an array of display pixels each having a square aspect ratio, the electronic camera comprising:

solid-state imaging means for generating analog image data in response to light received from the object and in response to a sampling clock having a sampling clock rate, the solid-state imaging means, including an array of imaging pixels each having a rectangular aspect ratio;

analog-to-digital converting means for converting the analog image data into digital image data at a clock rate corresponding to the sampling clock rate;

digital video processing means, connected to the analog-to-digital converting means, for processing the digital image data to generate video image data;

over-sampling means for over-sampling the digital image data N times to generate over-sampled image data;

interpolating means for interpolating the over-sampled image data from the over-sampling means to provide the output image data at a display clock rate, the display clock rate being different from the sampling clock rate and being chosen, in relation to the sampling clock rate, such that, when the output image data are displayed by the display device including the array of display pixels each having a square aspect ratio, the image is geometrically undistorted.

2. The electronic camera of claim 1, also comprising:

electronic view finder means for displaying an image of the object in response to the video image data; and digital-to-analog converting means connected between the digital video processing means and the electronic view finder means for converting the video image data supplied from the digital video processing means into analog video image data.

3. The electronic camera of claim 1, also comprising:

a first output terminal means for outputting therefrom the video image data; and a second output terminal means for outputting therefrom the output image data.

4. The electronic camera of claim 1, wherein the over-sampling means includes means for inserting zero data between consecutive ones of the digital image data to generate the over-sampled image data.

5. The electronic camera of claim 4, wherein:

each of the over-sampled image data has a position in the array of imaging pixels;

each of the output image data has a position in the array of display pixels; and the interpolating means includes:
positional difference calculating means, receiving the over-sampled image data, for calculating a positional difference for each one of the output image data, the positional difference for each one of the output image data being a difference between the position of the one of the output image data and the position of a one of the over-sampled image data closest in position to the one of the output image data,
coefficient determining means for determining, from the positional difference calculated by the positional difference calculating means, four coefficients for use in calculating the one of the output image data,
image data calculating means for calculating the one of the output image data by respectively multiplying four consecutive ones of the over-sampled image data by the four coefficients determined by the coefficient determining means to generate four products, the four consecutive ones of the over-sampled image data being the consecutive ones of the over-sampled image data closest in position to the one of the output image data, and summing means for summing the four products to generate the one of the output image data.

6. The electronic camera of claim 5, wherein the image data calculating means additionally comprises means, operating at the display clock rate, for feeding the output image data from the summing means to an output terminal.

7. The electronic camera of claim 5, wherein the interpolating means includes:

interpolation function performing means for interpolating modified data using an interpolation function having a first frequency-dependent characteristic to generate the output image data, and modified data generating means for generating the modified data by imposing on the over-sampled image data a second frequency-dependent characteristic substantially opposite the first frequency-dependent characteristic.

8. The electronic camera of claim 4, wherein the interpolating means includes:

interpolation function performing means for interpolating modified data using an interpolation function having a first frequency-dependent characteristic to generate the output image data, and modified data generating means for generating the modified data by imposing on the over-sampled image data a second frequency-dependent characteristic substantially opposite the first frequency-dependent characteristic.

9. The electronic camera of claim 1, wherein:

each of the over-sampled image data has a position in the array of imaging pixels;

each of the output image data has a position in the array of display pixels; and the interpolating means includes:

positional difference calculating means, receiving the over-sampled image data, for calculating a positional difference for each one of the output image data, the positional difference for each one of the output image data being a difference between the position of the one of the output image data and the position of a one of the over-sampled image data closest in position to the one of the output image data, coefficient determining means for determining, from the positional difference calculated by the positional difference calculating means, four coefficients for use in calculating the one of the output image data, image data calculating means for calculating the one of the output image data by respectively multiplying four consecutive ones of the over-sampled image data by the four coefficients determined by the coefficient determining means to generate four products, the four consecutive ones of the over-sampled image data being the consecutive ones of the over-sampled image data closest in position to the one of the output image data, and summing means for summing the four products to generate the one of the output image data.

10. The apparatus of claim 9, wherein the image data calculating means additionally comprises means, operating at the display clock rate, for feeding the output image data from the summing means to an output terminal.

11. The electronic camera of claim 1, wherein the interpolating means includes:

interpolation function performing means for interpolating modified data using an interpolation function having a first frequency-dependent characteristic to generate the output image data, and modified data generating means for generating the modified data by imposing on the over-sampled image data a second frequency-dependent characteristic substantially opposite the first frequency-dependent characteristic.

* * * * *